(12) United States Patent
Scott et al.

(10) Patent No.: US 6,721,812 B1
(45) Date of Patent: Apr. 13, 2004

(54) METHOD AND SYSTEM FOR ADAPTIVE RESOURCE MANAGEMENT

(75) Inventors: Derek Scott, Durham, NC (US); Eric R. Vook, Durham, NC (US); Carson J. Barker, Apex, NC (US); Thais Parsons, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 355 days.

(21) Appl. No.: 09/815,128

(22) Filed: Mar. 22, 2001

(51) Int. Cl.$^7$ .................................................. G06F 3/00
(52) U.S. Cl. .................... 710/5; 710/36; 710/61; 710/62; 710/73; 712/225
(58) Field of Search ..................... 710/5, 12, 18, 710/19, 31, 36, 39, 62–64, 72–74, 61; 712/225; 711/114, 148; 709/104

(56) References Cited

U.S. PATENT DOCUMENTS

| | | | | |
|---|---|---|---|---|
| 5,414,851 A | * | 5/1995 | Brice, Jr. et al. | 395/650 |
| 5,600,805 A | * | 2/1997 | Fredericks et al. | 710/5 |
| 5,745,915 A | * | 4/1998 | Cooper et al. | 711/114 |
| 6,061,750 A | * | 5/2000 | Beardsley et al. | 710/74 |
| 6,173,374 B1 | * | 1/2001 | Heil et al. | 711/148 |
| 6,195,703 B1 | * | 2/2001 | Blumenau et al. | 709/238 |
| 6,247,077 B1 | * | 6/2001 | Muller et al. | 710/74 |

* cited by examiner

*Primary Examiner*—Jeffrey Gaffin
*Assistant Examiner*—Rijue Mai
(74) *Attorney, Agent, or Firm*—A. José Cortina; Daniels Daniels & Verdonik, P.A.

(57) ABSTRACT

A method and system for managing I/O resources for communications between a host and a target device through at least one adapter, involves setting a local resource associated with each adapter. If a target device cannot accept an I/O request, the local resource associated with each adapter is set to the number of I/O resources currently used by each adapter associated therewith. The host is configured to issue no more than the local resource number of I/O requests to any individual adapter. The local resources may be periodically rebalanced to account for changes in system needs.

21 Claims, 5 Drawing Sheets

METHOD AND SYSTEM FOR ADAPTIVE RESOURCE MANAGEMENT

FIELD OF THE INVENTION

This invention relates to a method and system for managing resources for processing I/O requests from a host to a target device. The host has multiple adapters for transmitting the I/O requests to the target device. More specifically, the host assigns a number of I/O resources for issuing I/O requests to each adapter such that I/O requests are issued taking into account the number of I/O requests needed by each adapter and the number of I/O requests that can be processed by the system.

BACKGROUND OF THE INVENTION

In a host server with a connection to a target device, input/output (I/O) requests are used to establish an I/O connection for transferring information with the target device. As would be readily understood by one of ordinary skill in the art, an I/O request is any software operation that transfers data to or from a processor, and an I/O connection is a path or route through which I/O requests are transferred. A host is one or more computer processors, and a target device is any device external to the host that is connected to the host such that information may be exchanged with an I/O request. Target devices may be any device that adds capacity to the host, such as a disk storage device, any array of disk drives, printers or similar devices.

An adapter, or alternatively, a host bus adapter, is a physical device that allows one hardware or electronic interface to be accommodated and transmitted without a loss of functionality to another hardware or electronic interface. As used herein, an adapter is a device that establishes an I/O connection for transferring I/O requests, by adapting and transmitting information that is exchanged between the host and the target device.

Target devices generally have only a limited number of I/O requests that may be active at any given time. When the target device is unable to process a new I/O request, it returns the unfinished I/O request to the host with a "queue full" status. When the host issues an I/O request, the target device either accepts the I/O request and an I/O connection is established, or the target device returns the I/O with a queue full status. The host must reissue the unfinished I/O requests. Target devices generally are able to return only a limited number of I/O requests with a "queue full" status. If this number is surpassed, the target device never receives the request and thus, never responds to it. This situation is especially problematic because if the target device does not respond to multiple requests, the host may treat the connection to the target device as a bad connection. If the host treats the connection to the target device as a bad connection, it stops sending any I/O requests to the target device through the connection. In such a case, the connection may need to be reestablished manually.

One method for ensuring that all I/O requests are processed is to reissue the I/O request returned with a queue full status. The I/O request may be reissued multiple times until the target device accepts it. If the host does not receive any response from the target device as in the case discussed above, the host is configured to wait for a period of time for a response before it reissues the I/O request.

However, issuing I/O requests requires processor resources, and thus, if I/O requests must be reissued repeatedly, the system encounters decreased performance. Therefore, it becomes desirable to decrease the number of times an I/O request is reissued before it is accepted by the target device. One current method for decreasing the number of times an I/O request must be issued is to delay for a period of time before reissuing an I/O request that has been returned with a queue full status. There is an increased chance that the target device may have completed enough I/O requests, and thus, may have the necessary resources to process a new I/O request.

A disadvantage of this method is that the delay is an imprecise estimate of the amount of time the target device will take to process enough I/O requests such that new I/O requests may be processed. If the target device is able to accept new requests at the end of the delay, it is possible that the I/O request could have been processed before the end of the delay. In other words, the delay as an estimate of the amount of time that the target device needs to process enough I/O requests such that new I/O requests may be processed was too long. If the target device is not able to accept new requests at the end of the delay, the I/O request must be reissued, thus using processor time unnecessarily and decreasing performance in the system.

Another method involves reissuing a single I/O request after a delay until the target device accepts it. No other I/O requests are issued until the target device accepts the designated I/O request. Thus, all I/O requests are held by the host as "waiting" I/O requests until the designated I/O request is successfully accepted by the target device. Once the designated I/O request is accepted, all other waiting I/O requests are issued.

This method has one advantage of being able to use a shorter delay than the previously discussed method because only one I/O request will be issued repeatedly. Therefore, the I/O request does not have to compete with multiple I/O requests issued by the host. Because of the shorter delay, this method increases the precision with which the host determines that I/O requests may be sent to the target device.

One disadvantage of this method is that if a significant number of I/O requests are waiting on the host machine, the target device may be overwhelmed by I/O requests once the designated I/O request is accepted. This method does not provide for a way of monitoring the number of I/O requests that are issued simultaneously once the designated I/O request is accepted.

In order to minimize the number of I/O requests that are issued repeatedly, it is desirable in part to manage the I/O requests within the system such that the maximum number of I/O requests may be issued by the host with a minimal number of I/O requests returned by the target with a queue full status. These advantages and other advantages are provided by the system and method described herein, and numerous disadvantages of existing techniques are avoided.

SUMMARY OF THE INVENTION

In accordance with the system and method disclosed herein, a host manages and allocates I/O resources to issue I/O requests to a target device. By I/O resource is meant a software construct residing on the host that assigns the ability to issue a single I/O request. The host is configured such that it cannot issue an I/O request without an I/O resource, and each issued I/O request is associated with an I/O resource. As used herein, a used I/O resource is an I/O resource that has an issued I/O request associated therewith and an unused or available I/O resource is an I/O resource for which no I/O request has been issued.

A host is connected to the target device and has at least one adapter for sending I/O requests to the target device.

Each I/O request is associated with one particular adapter. The host assigns a local resource to each adapter. By local resource is meant a variable number of I/O resources associated with each adapter.

As used herein, an I/O request that is sent from the host to the target device is called an issued I/O request. If there are no available I/O resources with which to issue an I/O request, then the I/O request remains unissued on the host and is called a waiting I/O request. Because I/O requests are associated with a particular adapter, the waiting I/O request are also associated with a particular adapter and thus, the waiting I/O requests must wait until the adapter with which they are associated has an available I/O resource.

In one aspect, a method involves sending I/O requests from a host to a target device. The host has at least one adapter for sending the I/O requests to the target device. If the target device cannot accept the I/O request, it returns a queue full status to the host, and the host sets the local resource associated with the adapter to the number of I/O resources currently being used by the adapter. The host then issues no more than the local resource's number of requests at any given time for the adapter. The unissued requests are designated as waiting I/O requests that are issued once a resource becomes available.

In another aspect, in a system having two or more adapters, a method involves setting a local resource associated with each of the adapters to the number of I/O resources currently used by each adapter if the target device cannot accept an I/O request and returns a queue full status. The host will then issue no more than the local resource number of I/O requests associated with each adapter.

In yet another aspect of the invention, a method involves periodically rebalancing the local resources. By rebalancing the local resources is meant keeping the same or greater number of I/O resources in the system and reallocating the I/O resources between the local resources without receiving a queue full status. The rebalancing reflects changes within the system regarding the number of I/O resources needed with respect to the target device associated with each individual adapter. Preferably, the local resources are rebalanced if the local resource has not been adjusted within a threshold number of completed I/O requests. More preferably, the local resources are rebalanced if the local resource has not been adjusted within a threshold number of completed I/O requests, if the host has waiting I/O requests, and if the adapter has not been allocated a maximum number of I/O resources. As will be understood by one of ordinary skill in the art, adapters typically have a maximum capacity of I/O requests that may be issued. For example, a typical maximum capacity for an adapter may be 64 I/O requests, and therefore the maximum number of resources that should be allocated to such an adapter is 64. Therefore, the rebalancing will not occur if the maximum number of I/O resources have already been allocated to the local resource.

Preferably, the total number of I/O resources in the system is increased if there are more waiting I/O resources in the system than unused I/O resources. The increased number of I/O resources is then distributed to the local resources. More preferably, the total number of I/O resources in the system are distributed by increasing the local resource associated with each adapter that has waiting I/O requests associated therewith and decreasing the local resource associated with each adapter that has no waiting I/O requests associated therewith.

Most preferably, the total number of adjusted I/O resources in the system is the lesser of either the number of unused I/O resources in the system or the number of waiting I/O resources in the system. If the local resource associated with each adapter has waiting I/O requests associated therewith, the host increases the local resource by the total number of adjusted I/O resources in the system multiplied by the number of waiting I/O request associated with the adapter divided by the total number of waiting I/O requests in the system. If the local resource associated with each adapter does not have waiting I/O requests associated therewith, the host decreases the local resource by the total number of adjusted I/O resources in the system multiplied by the number of unused I/O request associated with the adapter divided by the total number of unused I/O requests in the system.

Preferably, the host rounds each increase or decrease to a local resource down to an integer number. The host then adds the fractional remainders from the increases to local resources to a first monitoring variable, and adds the fractional remainders from the decreases to local resources to a second monitoring variable. If either monitoring variable is equal to an I/O resource, the host adds one I/O resource to the local resource that it is currently adjusting.

In another aspect, the invention relates to a system for allocating I/O) resources. A host is connected to a target device. The host has at least one adapter for transmitting I/O requests to the target device. The host has one local resource associated with each of its adapters, and the local resources is assigned a variable number of I/O resources. The I/O resources are either used or unused I/O resources. The host is configured for issuing I/O requests if there is an available I/O resource and for retaining I/O requests as waiting requests if there are no available I/O resources. The host detects if the I/O request is accepted by the target device. The host has a first program routine for distributing the I/O resources if the target device does not accept the I/O request. The first program routine assigns a local resource to each adapter that is equal to the number of I/O requests issued by each adapter when an I/O request is returned with a queue full status. The host has a second program routine for allocating no more than the local resource number of I/O requests at a time to the each of the adapters.

By the terms "program routine" or "subroutine" is meant any block of code that may be logically grouped together and may or may not use the conventional subroutine interfaces as defined by typical programming languages. As would be understood by one of ordinary skill in the art, a program routine or subroutine is generally understood as a stylistic convention of programming, and thus different routines or subroutines may be written in multiple combinations and accomplish the same function. Thus, as used herein, a program routine or subroutine encompasses any block of code logically grouped together regardless of whether conventional subroutine interfaces as defined by typical programming languages are used.

Preferably, the host is configured to have a third program routine for periodically rebalance the local resources associated with the adapters. More preferably, the third program routine rebalances the local resources if the local resources have not been adjusted within a threshold number of completed I/O requests. Most preferably, the third program routine rebalances the local resources associated with the adapters if the local resources have not been adjusted within a threshold number of completed I/O requests, if the host has waiting I/O requests, if the adapter and if the adapter has not been allocated a maximum number of I/O resources.

Preferably, the threshold number of completed I/O requests is proportional to the total number of I/O resources in the system.

In another aspect, the third program routine has a first subroutine for increasing the total number of I/O resources in the system if there are more waiting I/O resources than unused I/O resources in the system, and a second subroutine for distributing the total number of I/O resources to the local resources.

In yet still another aspect, the second subroutine has a third subroutine for increasing the local resources for adapters that have waiting I/O requests associated therewith and for decreasing the local resources for adapters that do not have waiting I/O requests associated therewith.

Preferably, the third subroutine is programmed to determine the total number of adjusted I/O resources in the system. The total number of adjusted I/O resources in the system is the lesser of either the number of unused I/O resources in the system or the number of waiting I/O resources in the system. The third subroutine is programmed to increase the number of local resources for each adapter with waiting I/O requests by the total number of I/O resources in the system multiplied by a the number of waiting I/O requests associated with the local resource divided by the total number of waiting I/O requests in the system. The third subroutine is also programmed to decrease the number of local resources for each adapter without waiting I/O requests by the total number of I/O resources in the system multiplied by the number of unused I/O resources associated with the local resource divided by the total number of unused resources in the system.

Preferably, the third program subroutine is programmed to round the amount each local resource is increased down to an integer number and add the fractional remainder to a first monitoring variable. If the first monitoring variable is equal to or greater than an I/O resource, the host adds an I/O resource to the local resource being increased and subtracts the I/O resource from the first monitoring variable. The third program subroutine is also programmed to round the amount each local resource is decreased down to an integer number and add the fractional remainder to a second monitoring variable. If the second monitoring variable is equal to or greater than an I/O resource, the host adds one to the local resource being decreased and subtracts the I/O resource from the second monitoring variable.

DETAILED DISCUSSION

Figure 1:
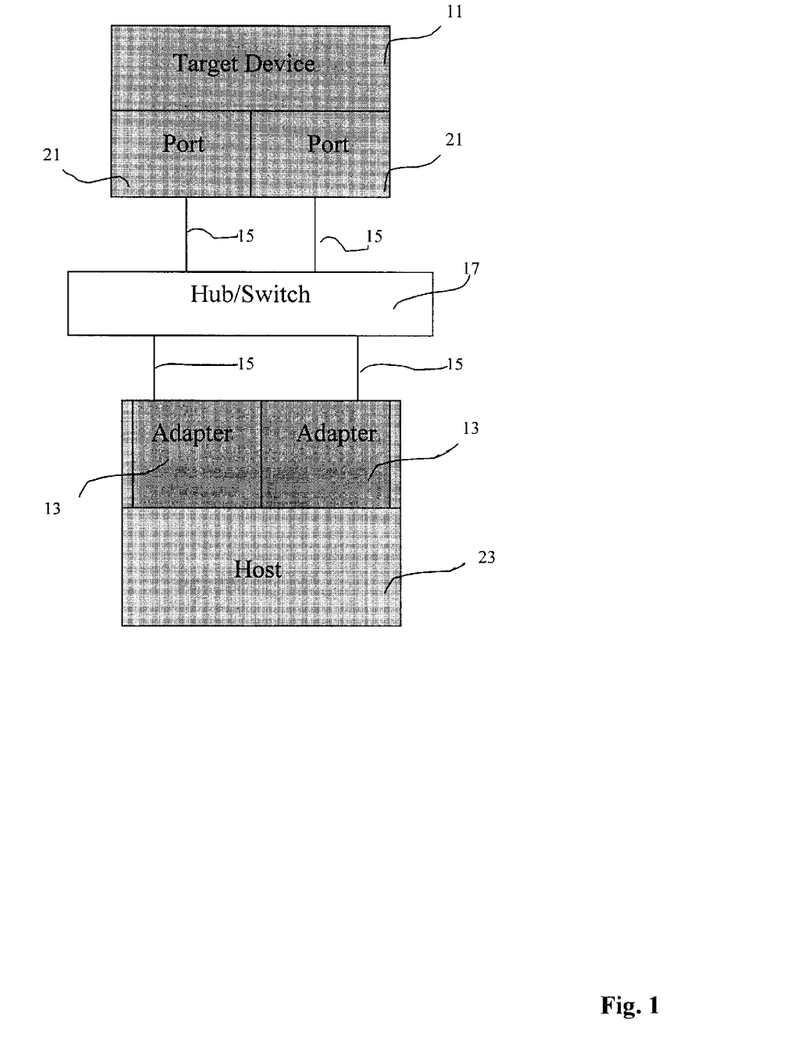
FIG. 1 is a schematic drawing of the system in block diagram form.

Referring to FIG. 1, an overall schematic block diagram of the system is shown. A host server 23 is connected to a target device 11. The host server is a computer that runs a computer program that provides services to other computer programs in the host or in other computers. The host can be one of the processors of a type which is commercially available under the names Intel™, AMD™ and Sun Microsystems.™ The host 23 has at least one processor and is connected by a cable 15 to the target device 11. The host 23 may be a server which includes configuration of processors such as a non-uniform memory access (NUMA) architecture. The host 23 has at least one adapter 13 for transmitting I/O requests to the target device 11.

NUMA refers to a method of configuring a cluster of processors such that memory is shared locally, improving performance and the ability of the system to be expanded. NUMA is used in a symmetric multiprocessing (SMP) system. In an SMP system, multiple processors working under a single operating system access each other's memory over a common bus or interconnect path. Ordinarily, a limitation of SMP is that as microprocessors are added, the shared bus or data path get overloaded and becomes a performance bottleneck. The NUMA architecture adds an intermediate level of memory shared amongst microprocessors in a local grouping such that all data is not transferred on the main bus. Examples of such systems are commercially available under the brand names Sequent™, $EMC^{2TM}$ and NCR.™

The target device 11 has at least one port 21. A port is a connection through which the target device 11 accepts I/O requests and transfers data. The ports 21 may be storage processors or directors that transfer data to disk arrays on the target device 11. The ports 21 may be configured such that an I/O request from the host 23 may be transferred through any storage processor 21. As would be understood by one of ordinary skill in the art, the connection cables 15 may be routed through a hub or switch 17. By hub or switch is meant a device where data arrives from one or more sources and is forwarded out to one or more sources.

The host 23 issues input/output (I/O) requests for transferring data between it and the target device 11. As would be readily understood by one of ordinary skill in the art, an adapter 13 on the host issues establishes an I/O connection, or path, through which an I/O request is transferred between the host 23 and the target device 11. A typical target device 11 has the capacity to accept a finite number of I/O requests at a given time. When the target device 11 can no longer accept I/O requests from the host, it returns the I/O request with a queue full status.

The host 23 assigns a local resource number associated with each adapter 13. The host 23 is configured to issue no more than the local resource number of I/O requests to each adapter 13 with which the local resource is associated. As used herein, by master resource is meant the sum of all the local resources within the system. The local resources are linked in sequential order on a master list. As will be understood from the discussion that follows, the local resources may be adjusted by either an adjustment due to a queue full status or rebalancing operation.

A first program routine distributes the I/O resources to the adapters if the I/O request is returned with a queue full status. The first program routine assigns a local resource to each adapter that is equal to the number of I/O requests issued by each adapter when an I/O request is returned with a queue full status. A second program routine allocates no more than the local resource number of I/O requests at a time to each of the adapters.

A third program routine periodically rebalances the local resources associated with the adapters. By rebalancing operation is meant the periodic readjustment of local resources without the receipt of a queue full status to account for any changes in the amount of resources needed by the adapters 13 with which the local resources are associated.

Figure 2:
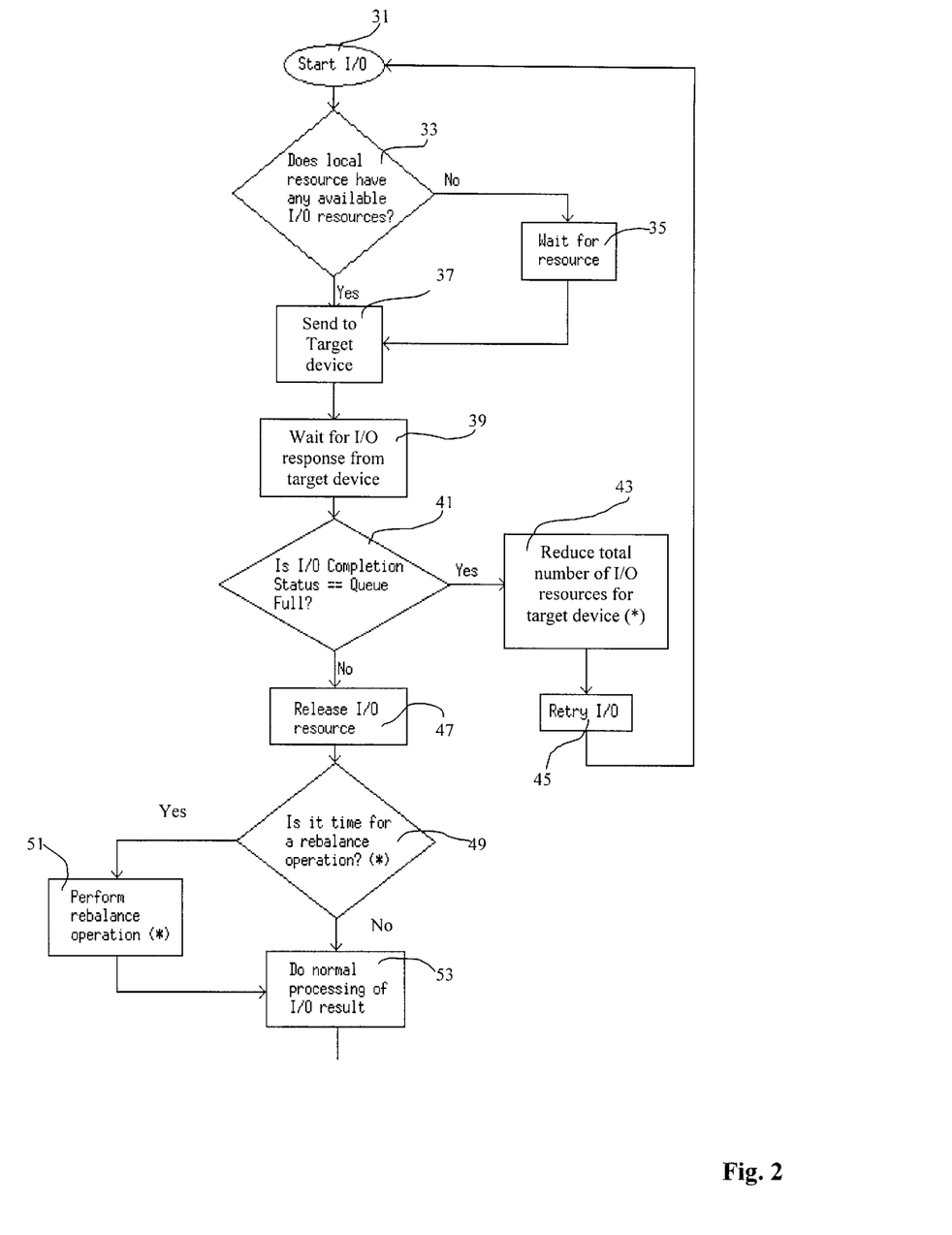
FIG. 2 is a diagram showing the overall flow of resource management on the system.

FIG. 2 shows the overall flow for setting the local resource numbers for each adapter 13. In step 31, the host 23 attempts an I/O request. As would be readily understood by one of ordinary skill in the art, each I/O request is associated with a specific adapter 13, which is designated to process the I/O request.

The host 23 queries at step 33 whether the local resource with which the I/O is associated has an available I/O resource. If there are no available I/O resources, i.e., the adapter 13 with which the I/O request is associated has the same or greater number of outstanding I/O requests as its local resource number, then the host 23 is configured by the second program routine, which allocates no more than the local resource number of I/O requests to the adapter, to wait at step 35 for an I/O resource to become available. The host 23 holds the I/O request as a waiting request until an I/O resource is available. When an I/O resource is available, the host issues at step 37 the I/O request by sending it to the target device. Alternatively, if there are available I/O resources, i.e., the adapter 13 with which the I/O request is associated has a smaller number of outstanding I/O connections than its local resource number, then the host 23 simply issues at step 37 the I/O request by sending it to the target device.

Next, the host 23 waits at step 39 for a response from the target device. When a response is received, the host 23 queries at step 41 whether the I/O completion status is a queue full. A queue full status indicates that the I/O request was not completed because the target device 11 could not accept the I/O request.

Figure 3:
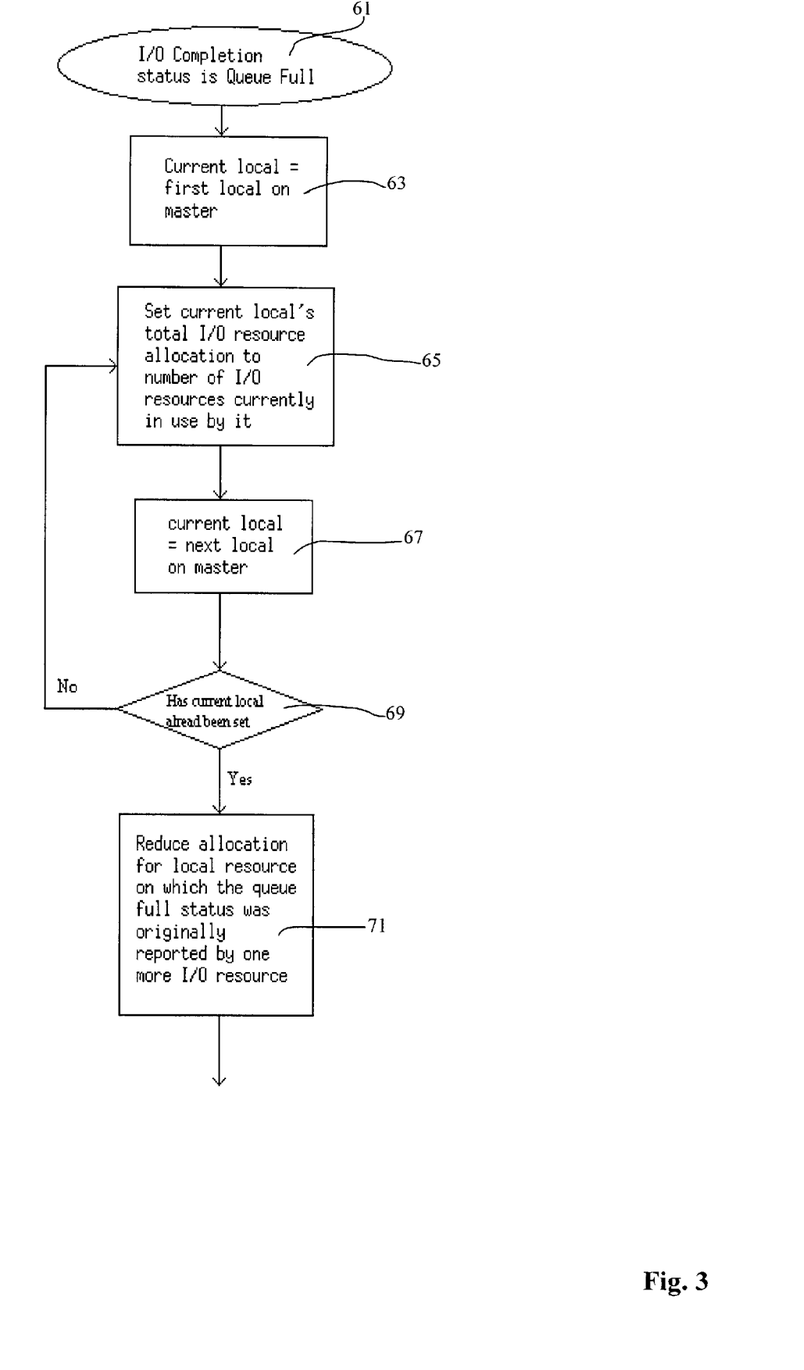
FIG. 3 is a diagram showing the flow of setting local resource numbers.

If a queue full status is received in step 41, the host 23 decreases at step 43 the total number of I/O resources for the target device. The process by which the host 23 sets the total number of I/O resources in step 43 using the first program routine for distributing I/O resources due to a queue full status is shown in FIG. 3, as will be described in detail below. After the host 23 sets the total number of I/O resources, the I/O request is retried at step 45.

If the I/O completion status is not a queue full status 41, the host releases the I/O resource at step 47. By releasing the I/O resource is meant that the host counts one I/O resource as a used resource for the I/O request and an I/O connection is established.

Figure 4:
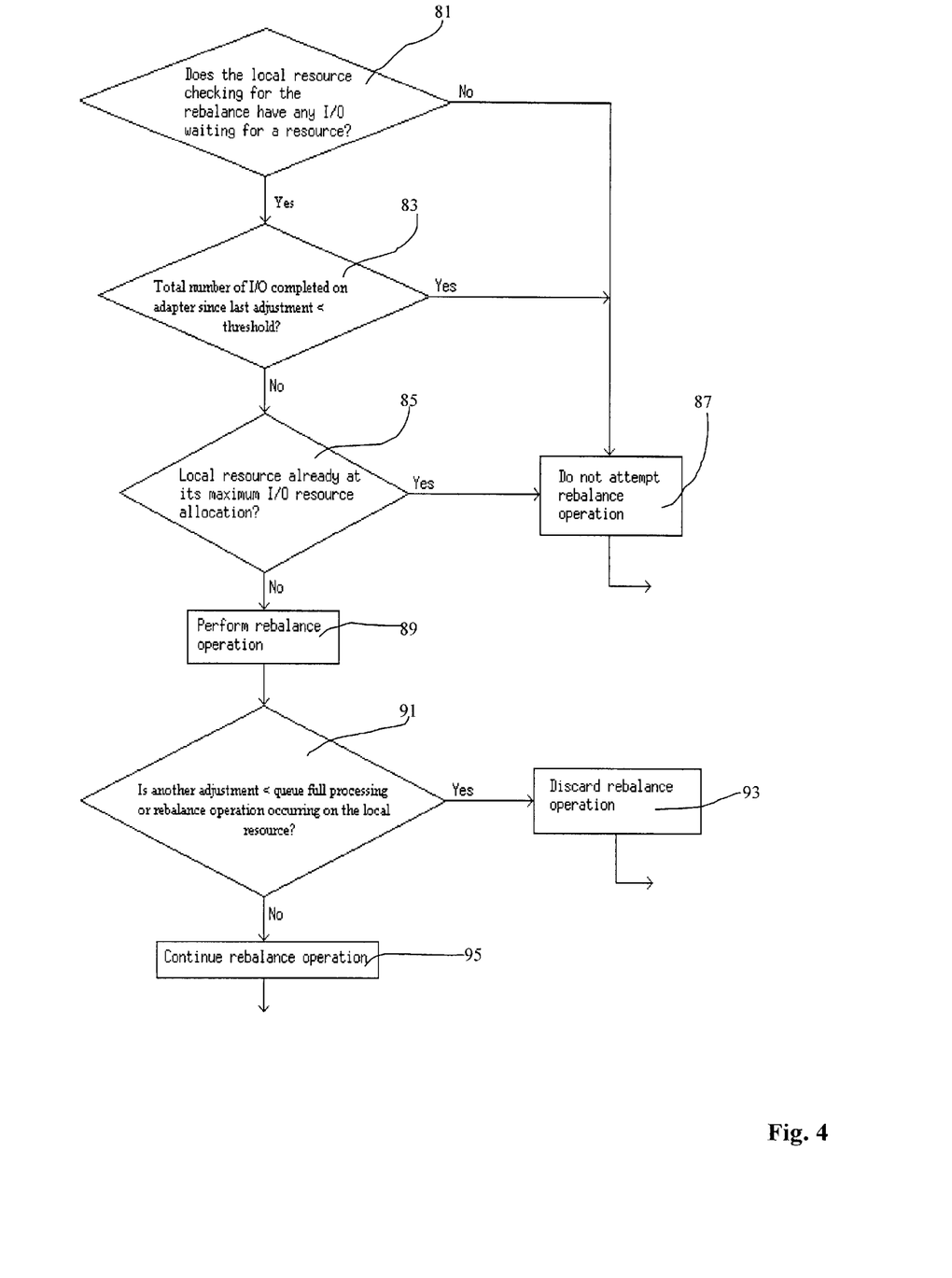
FIG. 4 is a diagram showing the flow of determining if the local resources should be rebalanced.

Next, the host 23 queries at step 49 whether a rebalancing operation is appropriate. The process by which the host 23 determines whether a rebalance operation is appropriate at step 49 is shown in FIG. 4, as will be described in detail below.

Figure 5:
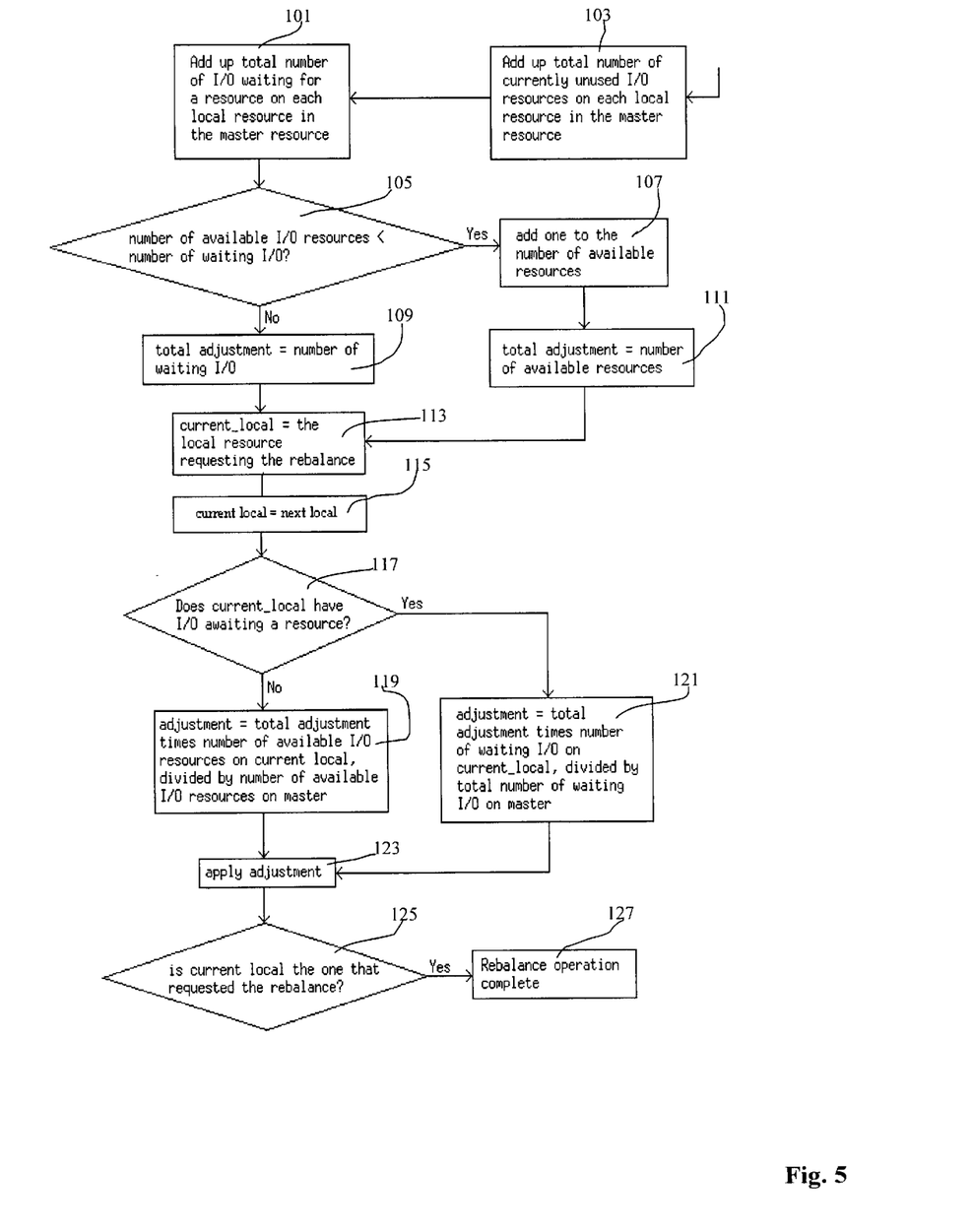
FIG. 5 is a diagram showing the flow of rebalancing local resource numbers.

If the host 23 determines that a rebalance operation is necessary, a rebalance operation is performed at step 51. The process by which the host 23 performs the rebalance operation at step 51 by running the third program routine for rebalancing the local resources is shown in FIG. 5, as will be described in detail below.

Finally, the host processes the I/O request at step 53. As would be readily understood by one of ordinary skill in the art, the I/O request may be processed using convention I/O connection and processing protocols and techniques.

Turning to FIG. 3, the process by which the total number of I/O resources is reduced due to a queue full status return in the first program routine is shown. First, the host detects an I/O completion status of queue full at step 61. The host 23 selects a local resource at step 63 on the master list to be designated as the "current local resource." Then the host 23 sets at step 65 the current local resource equal to the number of I/O resources currently being used by the adapter with which the local resource is associated. The host 23 then selects at step 67 the next local resource on the master list to be designated as the "current local resource."

The host 23 queries at step 69 whether the process outlined above has already reset the current local resource. If the current local has not already been reset, then the host repeats the process of setting the current resource equal to the total number of I/O resources currently being used by the adapter with which the local resource is associated at step 65.

Once all local resources have been set, preferably the host reduces at step 71 the allocation for the local resource associated with the adapter 13 on which the queue full status was reported to the host 23. More preferably, the host reduces the allocation for the local resource associated with the adapter 13 on which the queue full status was reported to the host 23 by one I/O resource. Thus, the host 23 sets the local resource associated with the adapter 13 on which the queue full status was reported equal to the number of successfully completed I/O requests.

FIG. 4 shows the process by which the host determines whether a rebalance operation is appropriate. As stated above, rebalance operation redistributes the local resource numbers associated with the adapters 23. The host queries at step 81 whether the local resource with which the I/O request is associated, i.e., the local resource checking for the rebalance, has waiting I/O requests. If there are no waiting I/O requests, the rebalance operation is not attempted at step 87, and, referring to FIG. 2, the I/O request is processed at step 53.

Referring again to FIG. 4, the host 23 then queries at step 83 whether the total number of I/O requests completed on the local resource since the local resource was last adjusted is less than a threshold number. If the total number of I/O requests completed on the local resource since the local resource was last adjusted is less than the threshold amount, the rebalance operation is not attempted at step 87. Preferably, the threshold amount of completed I/O requests is proportional to the total number of I/O resources in the system. More preferably, the threshold amount of completed I/O requests is the total number of I/O resources in the system multiplied by about 16.

If local resource is using the maximum number of I/O resources that the host 23 has allocated to it at step 85, a rebalance operation is not attempted in step 87. The maximum number of I/O resources is equal to the maximum number of I/O requests that an adapter has the capacity to issue. As would be understood by one of ordinary skill in the art, adapters typically have the capacity to issue a finite number of I/O requests. However, if the local resource has not used all of its available I/O resources, a rebalance operation is performed at step 89. The process by which a rebalance operation is performed is shown in detail in FIG. 5 and discussed below.

Next, the host queries whether another adjustment has occurred on the local resources at step 91. Step 91 involves determining whether another local resource has initiated either a reduction in the total number of I/O resources for the system due to a queue full status return by the first program routine or a rebalance operation by the third program routine. Because multiple I/O requests may be issued at a given time that are each associated with a particular adapter 13, each request has the potential for initiating either a rebalance operation or a reduction in the total number of I/O resources for the system due to a queue full status return. Thus, it is advantageous to limit the number of readjustments made to the local resources at any given time. Therefore, if another adjustment is currently occurring, the rebalance operation is discarded at 93. If the host discards the rebalance operation, the host 23 returns the local resources to the number of I/O resources previously allocated before the rebalance operation. On the other hand, if no other readjustments are currently occurring, the rebalance operation is kept.

FIG. 5 shows the flow of the rebalance operation performed by the third program routine. First the host 23 totals the number of unused I/O resources on all the local resources at step 103 and the total number of waiting I/O requests on all the local resources at step 101. If the host determines at step at step 105 there are fewer unused (available) I/O resources than waiting I/O requests, then the host 23 adds at least one to the total number of available I/O resources for distribution amongst the local resources at step 107, and a total adjustment variable is set to the new number of available I/O resources 111 at step 111. If the host determines at step 105 that there are more unused (available) I/O resources than waiting I/O requests, the total adjustment variable is set to the number of waiting I/O requests at step 113.

The host designates the local resource associated with the I/O request for which a rebalance operation has been requested as the "current local resource" at step 113. If the host determines at step 117 that the current local has waiting I/O resources, then the adjustment is set at step 121 equal to the previously calculated total adjustment times the number of waiting I/O requests on the current local divided by the total number of waiting I/O requests in the system. If the host determines at step 117 that the current local does not have any waiting I/O requests, then the adjustment is set at step 119 equal to the previously calculated total adjustment times the number of unused I/O resources on the current local divided by the number of available I/O resources in the system.

The local resource is then rebalanced by applying the adjustment at step 123. The previously calculated adjustment is added to the local resource if the current local resource has waiting I/O requests and is subtracted if the current local resources has no waiting I/O requests.

If the host determines at step 125 that the current local resource is not the first local resource for which the rebalance operation was requested, the next local resource in the master list is designated as the next local in step 115. If the host determines at step 125 that the current local is the first local resource for which the rebalance operation was requested, i.e., all local resources have been rebalanced, the rebalance operation is completed at step 127. The I/O request is then processed normally as shown in FIG. 1 at 53.

When the adjustment is calculated in either step 119 or 121, the adjustment may be a fractional number, however, it is desirable to assign I/O resources to adapters in integer numbers. In order to assign I/O resources in integer numbers, the host must round any fractional adjustments calculated in steps 119 or 121 to an integer number.

Preferably, the host has a variable for monitoring the remainders such that when the remainders from multiple calculations in steps 119 or 121 accumulate the equivalent of an I/O resource, an I/O resource is added to the system. For example, the fractional portion of the adjustment number calculated in steps 119 or 121 is added to the variable at each adjustment calculation for each adapter. If the variable reaches a value greater than 1, the host determines that an additional I/O resource is available to be assigned to an adapter. When the host assigns the additional I/O resource to an adapter, the host subtracts 1 from the variable and continues to add the fractional portion of the adjustment number calculated in steps 119 or 121 to the variable. The simplest method for the host to assign the additional I/O resource is for the host to add one to the adjustment calculated in either step 119 or 121. However, the host may assign the I/O resource to other adapters in the system.

In addition, the host may have one variable for monitoring the fractional portion of the adjustments calculated in step 119 and a second variable for monitoring the fractional portion of the adjustments calculated in step 121. If the either variable is greater than the equivalent of one I/O resource, the host distributes the I/O resource as described above.

In the preferred embodiment, the third program routine for a rebalance operation has a subroutine that rounds non-integer adjustments by designating a first variable for monitoring the fractional portion of the adjustments calculated in step 119 and a second variable for monitoring the fractional portion of the adjustments calculated in step 121 as described above. With respect to the variable for monitoring the fractional portion of the adjustments calculated in step 119, the fractional remainder will always be a number divided by the number of available I/O resource in the system. Similarly, with respect to the variable for monitoring the fractional portions of the adjustments calculated in step 121, the fractional remainder will always be a number divided by the number of waiting I/O requests in the system. The host adds the integer remainder to the appropriate variable. For example, a representative group of successive fractional remainders from the adjustment calculation in either step 119 or step 121 could be as follows:

$$\frac{4}{8}, \frac{3}{8}, \frac{2}{8}$$

where the denominator, 8, is either the number of available I/O resources in the system for the remainders from step 119 or the total number of waiting I/O in the system for the remainders from step 121.

For the successive fractional remainders in the example above, the fractional monitoring variable is 4+3+2=9. When the fractional monitoring variable is equal to or greater than the denominator, the host adds one to the adjustment calculated in step 123 and subtracts the denominator from the fractional monitoring variable. In this example, after the host adds one to the adjustment calculated in step 123, the host subtracts 8 from the fractional monitoring variable. Thus, the fractional monitoring variable is 1 for future calculations.

Having thus generally described the invention, the same will become better understood from the following claims in which it is set forth in a non-limiting manner.

What is claimed is:

1. A method of managing input/output (I/O) resources in a system comprising a target device operatively connected to a host, wherein said host has at least one adapter for sending I/O requests to said target device, comprising:

sending an I/O request from said host through a first adapter to a target device, said first adapter having a first local resource associated therewith;

if said target device cannot accept the I/O request, setting said first local resource to the number of I/O resources currently being used by said first adapter;

issuing no more than said first local resource number of I/O requests at a time through said first adapter; and designating unissued I/O requests as waiting I/O requests on said host.

2. A method of managing input/output (I/O) resources in a system comprising a target device operatively connected to a host, wherein said host has two or more adapters for transferring I/O requests from said host to said target, comprising:

sending an I/O request from said host through a first adapter to a target device, said first adapter having a first local resource associated therewith;

if said target device cannot accept the I/O request, setting said first local resource to the number of I/O resources currently being used by said first adapter, a local resource being associated respectively with each of the others of said two or more adaptors, and setting each local resource associated with each of the others of said two or more adapters to the member of I/O resources currently being used by each of said adapters;

for each adapter, issuing no more than the local resource number of I/O requests associated respectively therewith at a time; and designating unissued I/O requests as waiting I/O requests on said host.

3. The method of claim 2 further comprising:
periodically rebalancing said local resources.

4. The method of claim 2 further comprising:
if said first local resource has not been adjusted within a threshold number of completed I/O requests, rebalancing said local resource associated with all of said adapters.

5. The method of claim 2 further comprising:
if said host has waiting I/O requests, if said first local resource has not been adjusted within a threshold number of completed I/O requests, and if said first local resource has not reached its maximum I/O resource allocation, rebalancing said local resource associated with of all said adapters.

6. The method of claim 5, wherein said threshold number of completed I/O requests is proportional to the total number of I/O resources in said system.

7. The method of claim 5 wherein said rebalancing step further comprises:
if there are more waiting I/O resources in said system than unused I/O resources, increasing the total number of I/O resources in said system; and
distributing the total number of said I/O resources in said system to said local resources.

8. The method of claim 7 wherein said distributing step further comprises:
for each adapter, if said adapter has waiting I/O requests associated therewith, increasing said local resource associated with said adapter; and
for each adapter, if said adapter does not have waiting I/O requests associated therewith, decreasing said local resource associated with said adapter.

9. The method of claim 7 wherein said distributing step further comprises:
determining a total number of adjusted I/O resources in said system, wherein said a total number of adjusted I/O resources is the lesser of either the number of unused I/O resources in said system or the number of waiting I/O resources in said system;
for each adapter, if said local resource associated with said adapter has waiting I/O requests associated therewith, increasing said local resource by the total number of adjusted I/O resources multiplied by the proportion of the number waiting I/O requests associated with said local resource and the total number of waiting I/O requests on said system; and
for each adapter, if said local resource associated with said adapter does not have waiting I/O requests associated therewith, decreasing said local resource by the total number of adjusted I/O resources multiplied by the proportion of the number of unused I/O resources associated with said local resource and the total number of unused I/O resources in said system.

10. The method of claim 9, further comprising:
detecting if said local resources are currently being readjusted; and
discarding the rebalancing if said local resources are currently being readjusted.

11. The method of claim 9, wherein said distributing step further comprises:
rounding said increasing step down to an integer number;
rounding said decreasing step down to an integer number;
adding the fractional remainder representing a fraction of an I/O resource from said increasing step to a first monitoring variable;
adding the fractional remainder representing a fraction of an I/O resource from said decreasing step to a second monitoring variable;
if said first monitoring variable is equal to an I/O resource, adding one to said local resource and subtracting said I/O resource from said first monitoring variable; and
if said second monitoring variable is equal to an I/O resource, subtracting one from said local resource and subtracting said I/O resource from said second monitoring variable.

12. A system for managing input/output (I/O) resources, comprising:
a target device operatively connected to a host;
at least one adapter operatively connected to said host and said target device for transferring I/O requests from said host to said target device;
at least one local resource associated with each of said adapters, wherein each of said local resources are a variable number of said I/O resources;
said I/O resources further comprising used I/O resources and unused I/O resources;
said host being configured for issuing I/O requests if there are unused I/O resources and for retaining I/O requests as waiting I/O requests if there are no unused I/O resources;
said host being further configured for detecting if said I/O request is accepted by said target device, and
wherein said host is further configured to have
a first program routine for distributing said I/O resources if said I/O request is returned with a queue full status;
wherein said first program routine is configured to assign the local resource to each adapter that is equal to the number of I/O requests issued by each adapter when an I/O request is returned with a queue full status; and
a second program routine for allocating no more than said local resource number of I/O requests at a time to each of said adapters.

13. The system of claim 12 further comprising:
at least two adapters including a first adapter;
a first local resource associated with said first adapter;
wherein said host is further configured to have a third program routine for periodically rebalancing said local resources associated with each of said adapters.

14. The system of claim 13, wherein said third program routine is programmed to rebalance said local resources if said first local resource has not been adjusted within a threshold number of completed I/O requests.

15. The system of claim 13, wherein said third program routine is programmed to rebalance said local resources if said host has waiting I/O requests, if said first local resource has not been adjusted within a threshold number of completed I/O requests, and if said first local resource has not reached its maximum I/O resource allocation.

16. The system of claim 15, wherein the threshold number of complete I/O requests is proportional to the total number of I/O resources in said system.

17. The system of claim 15, wherein said third program routine comprises:
- a first subroutine for increasing the total number of said I/O resources in said system if there are more waiting I/O resources than unused I/O resources in said system; and
- a second subroutine for distributing the total number of said I/O resources in said system to said local resources.

18. The system of claim 17 wherein said second subroutine further comprises:
- a third subroutine, wherein said third subroutine is programmed to increase said local resources for each adapter having waiting I/O requests associated therewith and to decrease said local resources for each adapter not having waiting I/O requests associated therewith.

19. The system of claim 17 wherein,
said third subroutine is further programmed to determine a total number of adjusted I/O resources in said system, wherein said a total number of adjusted I/O resources is the lesser of either the number of unused I/O resources in said system or the number of waiting I/O resources in said system;
said third subroutine is further programmed to increase said local resources for each adapter having waiting I/O requests associated therewith by the total number of adjusted I/O resources multiplied by the number of waiting I/O requests associated with said local resource divided by the total number of waiting I/O requests in said system; and
said third subroutine is further programmed to decrease said local resources for each adapter not having waiting I/O requests associated therewith by the total number of adjusted I/O resources multiplied by the number of unused I/O resources associated with said local resource divided by the total number of unused I/O resources in said system.

20. The system of claim 19, wherein said host is further configured to have:
- a fourth program routine for discarding the readjustment if said local resources are currently being readjusted by at least one of said first or third program routines.

21. The system of claim 19, wherein
said third program subroutine is programmed to
- round the amount each local resource is increased down to an integer number;
- add the fractional remainder from rounding to a first monitoring variable;
- if said first monitoring variable is equal to or greater than an I/O resource, add one to said first local resource and subtract said I/O resource from said first monitoring variable;
- round the amount each local resource is decreased down to an integer number;
- add the fractional remainder from rounding to a second monitoring variable; and
- if said second monitoring variable is equal to or greater than an I/O resource, add one to said first local resource and subtract said I/O resource from said second monitoring variable.

* * * * *